United States Patent Office 3,173,396
Patented Mar. 16, 1965

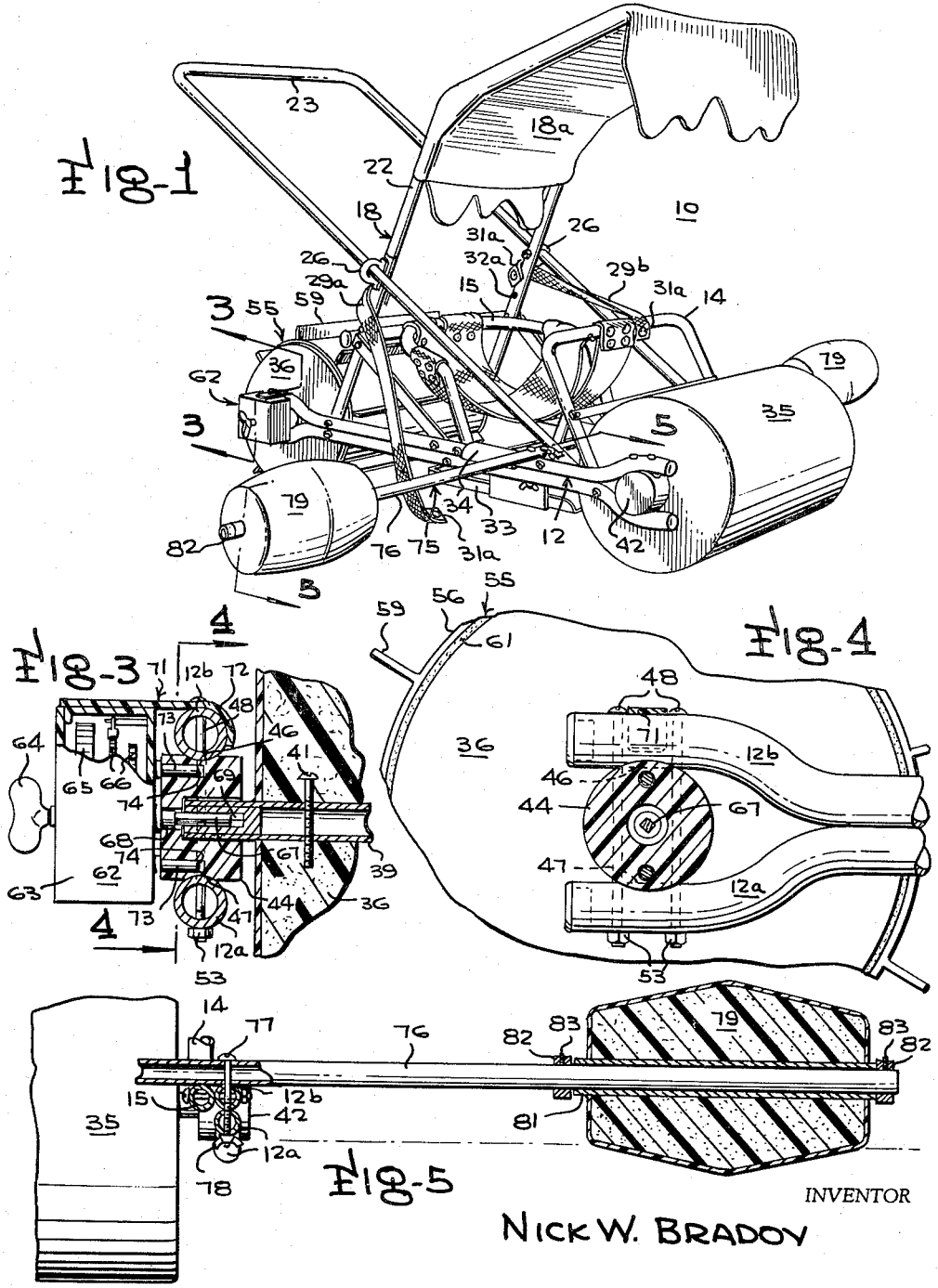

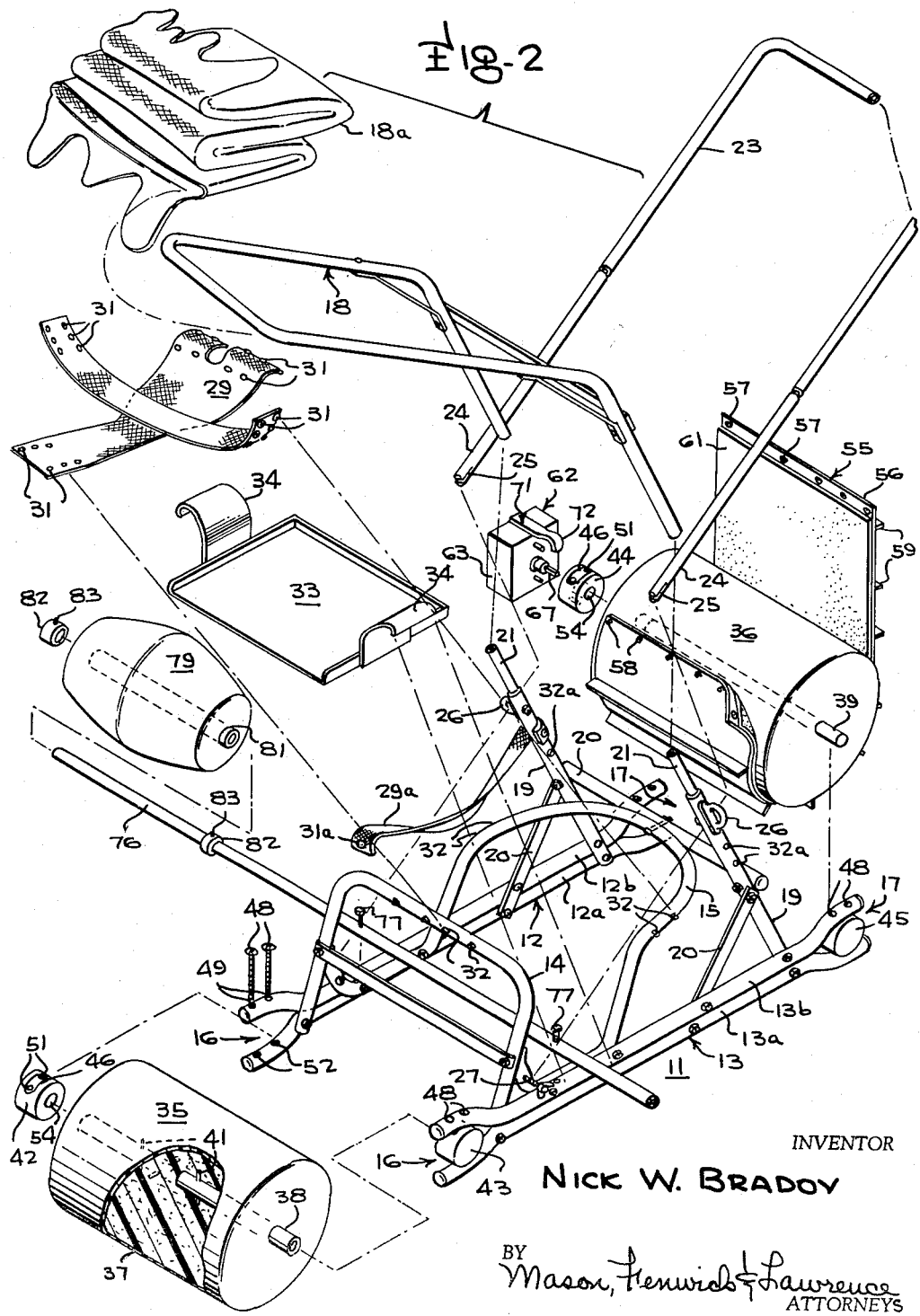

3,173,396
CHILD'S STROLLER
Nick W. Bradov, P.O. Box 2098, Deland, Fla.
Filed Mar. 12, 1964, Ser. No. 351,385
10 Claims. (Cl. 115—1)

The present invention relates to a stroller for use with children, and more particularly to an amphibious stroller which may be used on land in the normal fashion and also may be used in water as a boat.

An object of this invention is the provision of a child's walker having wheels so constructed as to allow a child to operate the walker forward and backward, but only in a straight line of travel.

Another object of this invention is the provision of a child's walker or stroller that can be operated by a small child through thick grass, in soft sand and over uneven terrain.

Another object of this invention is the provision of a child's stroller having wheels made in the shape of large cylinders of a floatable material that will allow the wheels to float in water and support a relatively large amount of weight.

Another object of this invention is the provision of a child's stroller that may be used both on land and water as either a plaything or as a conveyance for a child.

A still further object of this invention is to provide a floatable child's stroller in which a child may sit as the stroller floats and yet be assured of safety.

A further object of this invention is the provision of a floatable child's stroller that is motorized to provide independent propulsion to the stroller when upon the water.

Another object of this invention is the provision of a child's adjustable and convertible walker, stroller and plaything that can be used indoors and outdoors by infants before they can walk alone or by children up to three years of age.

Another object of this invention is to provide a child's amphibious stroller which will be relatively simple and inexpensive to manufacture, easy to assemble and disassemble, rugged, durable and safe in use.

Other objects, advantages and capabilities of the invention will become apparent from the following description, taken in conjunction with the accompanying drawings showing only a preferred embodiment of the invention.

FIGURE 1 is a perspective view of the child's amphibious stroller of the present invention;

FIGURE 2 is an exploded perspective view of the stroller showing the relative locations of the major components;

FIGURE 3 is a view partially in elevation and partially in vertical section taken along lines 3—3 of FIGURE 1 showing the motorized drive control for the stroller;

FIGURE 4 is a vertical section view taken along lines 4—4 of FIGURE 3 of a portion of the motorized drive control for the stroller; and FIGURE 5 is a sectional view taken along lines 5—5 of FIGURE 1 showing details of the outrigger construction.

Referring to the drawings wherein like reference characters designate corresponding parts throughout the several figures, the amphibious stroller of the present invention is indicated by numeral 10. Comprising stroller 10 is a generally rectangular tubular frame 11, elongated in the direction of intended movement of the stroller, having tubular side support rails 12, 13 and front seat support 14 and seat rear support 15. Each of the two tubular side rails 12, 13 are composed of two tubular side rail sections 12a, 12b and 13a, 13b joined in parallel relation to give strength to the undercarriage of the stroller. Diverging at their ends, the side rail sections 12a, 12b and 13a, 13b form yoke-shaped hub spaces 16, 17.

Fixedly mounted to side rails 12, 13 is the sunshade support frame 18 which comprises two sections. The lower section 19 is secured to the side rails 12, 13 and braced by bracing members 20. The upper ends of lower section 19 are of a reduced diameter, as indicated by 21, to accept the upper section 22 of the sunshade support frame 18 which is adapted to fit down upon the ends 21 of lower section 19 thereby forming a unitary removable sunshade support. To provide the actual sunshade, a cloth member 18a is provided that slips over the upper section 22 to a position that corresponds to the one shown in FIGURE 1.

The handle 23 is shaped generally as an elongated U having its lower ends 24 preferably filled with an epoxy to provide strength. The extreme ends of the handle 23 are then slotted, as shown by 25. To attach handle 23 to the stroller the lower ends 24 are passed through eye bolts 26 and then engaged by slots 25 to screws 27. Once the slots 25 are fully engaged with screws 27 the wing-nuts 28 are tightened down upon handle ends 24 to secure the handle 23 to the stroller. The cloth saddle seat 29 is adapted to engage the frontal seat support 14 and seat rear support 14 by means of gripper snaps 31 engaging gripper studs 32 which are mounted upon convenient locations of seat supports 14, 15. This method of attachment prevents the seat 29 from slipping around on the seat supports 14, 15 yet still allows the seat a swinging motion to provide a comfortable ride to the child, and further, the use of the gripper snaps 31 and studs 32 allow for easy removal of the seat 29 for cleaning, and in addition the plurality of rows of snaps 31 allow for adjustability of the seat height to suit the size of the child and for use in the various environments such as on land or in the water. In order that it is possible to hold the child in the seat 29 for safety's sake, or if need be forcibly, the side straps 29a, 29b are releasably secured to the sides of the lower sunshade support frame 19 and are provided with a gripper snap 31a and a stud 32a so that the straps 29a, 29b may be secured about the child. The studs 32a are located both on the inside and the outside of frame 19 to provide adjustment for the size of the child.

To provide means for resting the child's feet it is proposed to attach to the lower portion of the stroller a footrest 33 having upstanding frame clamps 34 which are made slightly resilient and curved at the upper ends outwardly, downwardly, and inwardly in order that as the tray is placed in position the clamps 34 engage side rail sections 12b and 13b and snap therearound to provide a tight fit. To remove the footrest 33 only a slight upward pressure upon the footrest is required to disengage the clamps 34 from side rail sections 12b and 13b.

An especially important aspect of this invention is the provision of large drum like rollers 35, 36 preferably made of a polyurethane foamed plastic which is covered with an exterior skin of fiberglass cloth 37 impregnated with a suitable polyester resin for both strength and waterproofing. Located axially through the center of rollers 35, 36 are axles 38, 39 respectively each having a plurality of radially extending studs 41 which project into each roller to secure the roller to the axles and to prevent slippage of the roller about the axles when the stroller is in motion. To mount the rollers 35, 36 upon the stroller it is anticipated that each roller will have a pair of hubs, the pairs being indicated by 42, 43 for axle 38 and 44, 45 for axle 39, whereupon the hubs will be mounted upon the free ends of the axles 38, 39.

In the outer periphery of the hubs 42, 43 and 44, 45 and on opposite sides thereof aer periphery troughs 46, 47 which comprise shallow depressions transverse to the longitudinal axis of the hubs to serve the purpose of providing a non-rotative mounting position for the hubs when placed in the yoke-shaped hub spaces 16, 17. To secure the hubs within the spaces 16, 17 a pair of through bolts 48 are inserted through holes 49 and side rail sections 12b and 13b and holes 51 in the hubs 42, 43 and 44, 45 and thence through holes 52 in side rail sections 12a and 13a. The bolts 48, when once in position, are secured in place by nuts 53 which act to hold the hubs in non-rotative relation with the side support rails 12, 13 and position them to act as bearing members for rollers 35, 36. It should be noted that the projecting ends of axles 38, 39 would be inserted into bearing apertures 54 of the hubs before the hubs are secured to the side rails 12, 13.

The rear roller 36 has mounted about its outer periphery a removable flexible paddle wheel cover 55 which converts the stroller into an ampribious vehicle for use in a swimming pool, at the beach or other suitable place. The paddle wheel cover 55 comprises an outer covering of relatively flexible nature that may easily be formed in a cylinder about roller 36 and then united at its ends by engaging gripper snaps 57 with gripper studs 58. Pre-formed with the outer covering 56 are a plurality of paddle blades 59 which act to propel the stroller through the water at such time as roller 36 is moved in a rotative manner. In order for the paddle blades 59 to operate properly it will be apparent that the blades should be affixed to or molded with the outer covering 56 in such a manner that they project outwardly from the covering 56 at a right angle and that there should be very little flexibility in the blades 59 with respect to covering 56. To prevent paddle wheel cover 55 from slipping about roller 36 it is proposed that a member of compressible foam rubber 61 or other similar material be inserted between outer covering 56 and roller 36.

In order that a convenient source of motive power be available to drive roller 36 and the associated paddle wheel cover 55, a water-proof wind-up motor 62 is provided in association with roller 36 and hub 44 to drive the stroller through the water. As shown in FIGURE 3 the motor 62 comprises an outer water-proof cover 63, a key 64 which engages a flat and substantially stiff coil spring 65 which, when wound to its tight position and released, will transmit force to gear members 66 and thence to drive shaft 67. The squared end of motor shaft 67 projects through an aperture 68 in the end of hub 44 and into a complementary square-shaped receiving recess 69 of the outer end of axle 39. To secure motor 62 to the stroller a locking tab 71 is attached to the top of the water-proof case 63 and projects inwardly towards the stroller in order that a downwardly turned portion 72 will engage tubular side rail 12b and snap therearound to hold the motor 62 in close fitting relation to the hub 44. To prevent reaction and the small moment of inertia of the motor 62 from turning it about its own axis, keying pins 73 are provided facing inwardly of the motor toward the hub 44 to be received into recesses 74 of the hub to safely and thoroughly secure the motor to the stroller.

Since the stroller of this invention is to be used in the water as well as on dry land and also used with small children, an outrigger assembly 75 is proposed to be mounted in conjunction with the stroller 10 to give flotation stability to the stroller when it is in the water. Comprising the outrigger assembly 75 is an outrigger shaft 76 that is adapted to be attached to the stroller 10 by screws 77 mounted through suitable holes in the outrigger shaft 76 and projecting through tubular side rails 12, 13. Fixedly securing outrigger shaft 76 to side rails 12, 13 are wing nuts 78 on the underside of side rail sections 12a and 13a. It should be noted, however, that outrigger shaft 76 may be mounted on the underside of stroller 10 to compensate for extra weight that may be placed in the stroller in order that greater buoyancy may be given to the stroller. To provide for the buoyant capabilities of outrigger 75 there is mounted on the extreme ends of outrigger shaft 76 pontoons 79 constructed in the same general manner as the floatable rollers 35, 36. That is to say, the pontoons 79 are constructed of a polyurethane foamed plastic covered with an exterior skin of fiberglass which is impregnated with a suitable polyester resin for giving both strength and water-proof qualities to the pontoons. Mounted axially through pontoon 79 for giving a bearing surface thereto are pontoon shafts 81 which have an internal diameter slightly less than the exterior diameter of outrigger shaft 76 to provide a freely rotatable surface by which the pontoons 79 may rotate about outrigger shaft 76 to prevent wear on the pontoons if they are used in conjunction with the stroller on dry land. To secure the pontoon 79 at the extremities of outrigger shaft 76 there is provided locating collars 82 mounted upon outrigger shaft 76 at each end of pontoon shafts 81; the collars 82 are merely locative means only and do not hinder the rotative movement of the pontoons 79. The collars 82 remain in the desired location by means of a set-screw 83 which projects through the collar 82 and engages the outrigger shaft 76.

To operate the stroller in the water the procedure would be to place the stroller upon the water and then turn the key 64 in a manner to compress the spring 65 into a tight coil. When the spring 65 is sufficiently wound the key would be released thereby allowing the spring 65 to impart its energy to the gear members 66 which would transmit the resultant power through motor shaft 67 to rear axle 39 which would in turn revolve roller 36 along wtih paddle wheel cover 55. Upon such movement the paddle blades 59 would engage the water and propel the stroller 10 forwardly. If it were desired to operate the stroller upon land for an extended duration, the paddle wheel cover 55 and the outrigger assembly 75 would be preferably removed to convert the stroller to a land operable vehicle. Of course, the motor 62 should also be removed for land operation to prevent damage to the spring 65 by movement of the stroller acting to wind or unwind the spring 65 to a point exceeding its elastic limit.

The above construction has shown a new and novel child's amphibious stroller in which various portions of the stroller may be removed for cleaning and for ease of transportation. The handle 23, sun shade 18 and outrigger assembly 75 may be easily dismantled from the main body of the stroller 10 to give greater portability to the entire device and to give the device a size that may be easily carried in an ordinary automobile.

In addition to using the stroller for pushing a child around in, the invention may also be used as a child's walker in which, due to the inherent qualities of the non-steerable rollers 35 and 36, the stroller can be moved only forward and backward in a straight line by a small child who does not have the ability to turn the stroller. In this capacity the stroller serves as a baby-tender in that the small child can be safely confined therein by the side straps and allowed to push the stroller back and forth and yet the limits of travel may be contained by setting an obstacle at each end of the straight line path of the stroller to prevent its progressing further in either direction. Everything to either side of this straight line is out of reach of the child.

An older child using the stroller as a playing will steer it by lifting up the front end of the stroller, turning it in the desired direction, placing the front end down again and pushing the stroller on in the new direction. When being used as a stroller, steering is normally accomplished by either lifting up or pushing down on the stroller handle 23 until either the rear roller 36 or front roller 35 is free of the ground, and then pivoting the stroller on whichever roller is in contact with the ground.

It is to be noted that the materials used in manufacture of the stroller 10 may be of many varieties including tubular aluminum, molded plastic or even wood. In addition the rollers 35, 36 and the pontoons 79 may be made of an inflatable bag or even some other construction to give the desired flotation characteristics to the above mentioned rollers and pontoons.

What I have particularly shown and described one particular embodiment of the invention, it is distinctly understood that the invention is not limited thereto but that modifications may be made within the scope of the invention and such variations as are covered by the scope of the appended claims.

What is claimed is:

1. A convertible and adjustable conveyance for infants and children for use indoors and outdoors either on land or in water, comprising a generally rectangular frame, the frame including side rails which have a yoke-shaped portion at each terminal end thereof, bearing members adapted to be received in the yoke-shaped portions, floatable front and rear rollers adapted to be mounted in the bearing members, removable handle means attached to the frame, outrigger means attached to the frame to provide water-borne stability to the conveyance, and means associated with at least one of the rollers to propel the conveyance through the water.

2. A conveyance for children for use either on land or in water, comprising a generally rectangular frame, the frame including side rails which have a yoke-shaped portion at each terminal end thereof, bearing members adapted to be received in the yoke-shaped portions, floatable foamed plastic cylindrical front and rear rollers adapted to be mounted in the bearing members, removable handle means attached to the frame, outrigger means attached to the frame to provide water-borne stability to the conveyance, and means associated with at least one of the rollers to propel the conveyance through the water.

3. A conveyance for children for use either on land or in water, comprising a generally rectangular frame, the frame including side rails, each of the side rails having two tubular side rail sections joined in parallel relation, the longitudinal center lines of the joined side rail sections lying in a common plane, the terminal ends of each of the side rail sections diverging from the center line of the side rail section and lying in the common plane to form a yoke-shaped portion at each terminal end thereof, bearing members adapted to be received in the yoke-shaped portions, floatable foamed plastic cylindrical front and rear rollers adapted to be mounted in the bearing members, removable handle means attached to the frame, outrigger means attached to the frame to provide water-borne stability to the conveyance, and means associated with at least one of the rollers to propel the conveyance through the water.

4. A conveyance for children for use either on land or in water, comprising a generally rectangular frame, the frame including side rails, each of the side rails having two tubular side rail sections joined in parallel relation, the longitudinal center lines of the joined side rail sections lying in a common plane, the terminal ends of each of the side rail sections diverging from the center line of the side rail section and lying in the common plane to form a yoke-shaped portion at each terminal end thereof, bearing members adapted to be received in the yoke-shaped portions, floatable foamed plastic cylindrical front and rear rollers, axle means projecting axially through the longitudinal center of the rollers and terminating exterior thereof whereby the rollers are adapted to be mounted in the bearing members, removable handle means attached to the frame, outrigger means attached to the frame to provide water-borne stability to the conveyance, and means associated with at least one of the rollers to propel the conveyance through the water.

5. A conveyance for children for use either on land or in water, comprising a generally rectangular frame, the frame including side rails, each of the side rails having two tubular side rail sections joined in parallel relation, the longitudinal center lines of the joined side rail sections lying in a common plane, the terminal ends of each of the side rail sections diverging from the center line of the side rail section and lying in the common plane to form a yoke-shaped portion at each terminal end thereof, bearing members adapted to be received in the yoke-shaped portions, floatable foamed plastic cylindrical front and rear rollers, axle means projecting axially through the longitudinal center of the rollers and terminating exterior thereof whereby the rollers are adapted to be mounted in the bearing members, means integral with the axle means to secure the rollers firmly thereto whereby relative movement between the axle means and the rollers is prevented, removable handle means attached to the frame, outrigger means attached to the frame to provide water-borne stability to the conveyance, and means associated with at least one of the rollers to propel the conveyance through the water.

6. A conveyance for children for use either on land or in water, comprising a generally rectangular frame, the frame including side rails, each of the side rails having two tubular side rail sections joined in parallel relation, the longitudinal center lines of the joined side rail sections lying in a common plane, the terminal ends of each of the side rail sections diverging from the center line of the side rail section and lying in the common plane to form a yoke-shaped portion at each terminal end thereof, bearing members adapted to be received in the yoke-shaped portions, floatable front and rear rollers adapted to be mounted in the bearing members, removable handle means attached to the frame, outrigger means attached to the frame to provide water-borne stability to the conveyance, the outrigger means comprising a shaft mounted on the frame transverse to the common planes of the tubular side rail sections and pontoons mounted for rotation at the extreme ends of the shaft, and means associated with at least one of the rollers to propel the conveyance through the water.

7. A conveyance for children for use either on land or in water, comprising a generally rectangular frame, the frame including side rails which have a yoke-shaped portion at each terminal end thereof, bearing members adapted to be received in the yoke-shaped portions, floatable front and rear rollers adapted to be mounted in the bearing members, removable handle means attached to the frame, outrigger means attached to the frame to provide water-borne stability to the conveyance, and means associated with at least one of the rollers to propel the conveyance through the water including a removable flexible paddle wheel cover adapted to be mounted about the outer periphery of at least one of the rollers, a plurality of blades affixed to the paddle wheel cover to project perpendicularly therefrom, a source of motive power in intimate relation with the roller having the paddle wheel cover.

8. A conveyance for children for use either on land or in water, comprising a generally rectangular frame, the frame including side rails which have a yoke-shaped portion at each terminal end thereof, bearing members adapted to be received in the yoke-shaped portions, floatable front and rear rollers adapted to be mounted in the bearing members, removable handle means attached to the frame, outrigger means attached to the frame to provide water-borne stability to the conveyance, and means associated with at least one of the rollers to propel the conveyance through the water including a removable flexible paddle wheel cover adapted to be mounted about the outer periphery of at least one of the rollers, a plurality of blades affixed to the paddle wheel cover to project perpendicularly therefrom, a source of motive power in intimate relation with the roller having the paddle wheel cover, the source of motive power comprising a housing removably connected to the frame, gear means mounted within the housing, resilient means associated with the gear means to impart movement thereto, a motor shaft connecting the gear means with the axle means of the rollers having the paddle wheel cover, and means projecting from the housing into the adjacent bearing member to fixedly retain the housing in operative position whereby when the gear means impart motion to the axle means the paddle wheel rotates with its associated roller and propels the conveyance through the water.

9. A conveyance for children for use either on land or in water, comprising a generally rectangular frame, the frame including side rails which have a yoke-shaped portion at each terminal end thereof, bearing members adapted to be received in the yoke-shaped portions, floatable front and rear rollers adapted to be mounted in the bearing members, removable handle means attached to the frame, outrigger means attached to the frame to provide water-borne stability to the conveyance, the outrigger means comprising a shaft mounted on the frame transverse to the common planes of the tubular side rail sections and pontoons mounted for rotation at the extreme ends of the shaft, and means associated with at least one of the rollers to propel the conveyance through the water including a removable flexible paddle wheel cover adapted to be mounted about the outer periphery of at least one of the rollers, a plurality of blades affixed to the paddle wheel cover to project perpendicularly therefrom, a source of motive power in intimate relation with the roller having the paddle wheel cover, the source of motive power comprising a housing removably connected to the frame, gear means mounted within the housing, resilient means associated with the gear means to impart movement thereto, a motor shaft connecting the gear means with the axle means of the roller having the paddle wheel cover, and means projecting from the housing into the adjacent bearing member to fixedly retain the housing in operative position whereby when the gear means impart motion to the axle means the paddle wheel rotates with its associated roller and propels the conveyance through the water.

10. A conveyance for children for use either on land or in water, comprising a generally rectangular frame, the frame including side rails, each of the side rails having two tubular side rail sections joined in parallel relation, the longitudinal center lines of the joined side rail sections lying in a common plane, the terminal ends of each of the side rail sections diverging from the center line of the side rail section and lying in the common plane to form a yoke-shaped portion at each terminal end thereof, bearing members adapted to be received in the yoke-shaped portions, floatable foamed plastic cylindrical front and rear rollers, axle means projecting axially through the longitudinal center of the rollers and terminating exterior thereof whereby the rollers are adapted to be mounted in the bearing members, means integral with the axle means to secure the rollers firmly thereto whereby relative movement between the axle means and the rollers is prevented, removable handle means attached to the frame, outrigger means attached to the frame to provide water-borne stability to the conveyance, the outrigger means comprising a shaft mounted on the frame transverse to the common planes of the tubular side rail sections and pontoons mounted for rotation at the extreme ends of the shaft, and means associated with at least one of the rollers to propel the conveyance through the water including a removable flexible paddle wheel cover adapted to be mounted about the outer periphery of at least one of the rollers, a plurality of blades affixed to the paddle wheel cover to project perpendicularly therefrom, a source of motive power in intimate relation with the roller having the paddle wheel cover, the source of motive power comprising a housing removably connected to the frame, gear means mounted within the housing, resilient means associated with the gear means to impart movement thereto, a motor shaft connecting the gear means with the axle means of the roller having the paddle wheel cover, and means projecting from the housing into the adjacent bearing member to fixedly retain the housing in operative position whereby when the gear means impart motion to the axle means the paddle wheel rotates with its associated roller and propels the conveyance through water.

References Cited by the Examiner
UNITED STATES PATENTS

| D. 191,120 | 8/61 | Van Karsen | 34—15 |
|---|---|---|---|
| 1,369,670 | 2/21 | Kaufman | 114—123 |
| 1,400,984 | 12/21 | Ray | 180—20 |
| 3,112,727 | 12/63 | Kiefer | 115—1 |

FOREIGN PATENTS

| 25,109 | 1905 | Great Britain. |

MILTON BUCHLER, *Primary Examiner.*